United States Patent [19]
Yoshida et al.

[11] Patent Number: 5,271,072
[45] Date of Patent: Dec. 14, 1993

[54] IMAGE REDUCTION OF BINARY IMAGES USING FILTERING PROCESSING

[75] Inventors: Tadashi Yoshida, Ichikawa; Toshiaki Endoh, Tokyo; Naoto Kawamura, Kawasaki; Hisaharu Kato, Tokyo, all of Japan

[73] Assignees: Canon Kabushiki Kaisha; Kokusai Denshin Denwa Co. Ltd., Tokyo, Japan

[21] Appl. No.: 918,011

[22] Filed: Jul. 24, 1992

Related U.S. Application Data

[62] Division of Ser. No. 501,846, Mar. 30, 1990, Pat. No. 5,159,468.

[30] Foreign Application Priority Data

Jun. 30, 1989 [JP] Japan ................................. 1-167033

[51] Int. Cl.⁵ .............................................. G06K 9/36
[52] U.S. Cl. ........................................ 382/56; 382/47; 358/451
[58] Field of Search ...................... 358/451, 448, 452; 382/47, 49, 54, 56

[56] References Cited

U.S. PATENT DOCUMENTS

| | | | |
|---|---|---|---|
| 4,703,350 | 10/1987 | Hinman | 382/56 |
| 4,870,695 | 9/1989 | Gonzales et al. | 382/56 |
| 5,086,487 | 2/1992 | Katayama et al. | 382/47 |
| 5,159,468 | 10/1992 | Yoshida et al. | 358/451 |

OTHER PUBLICATIONS

Patent Abstracts of Japan, vol. 8, No. 275, (Kokai 59-142666), (Aug. 1984), (abstract).

*Primary Examiner*—Jose L. Couso
*Attorney, Agent, or Firm*—Fitzpatrick, Cella, Harper & Scinto

[57] ABSTRACT

An image reduction system which reduces binary level images is disclosed. In the system, a reduction pixel value is determined by using, as reference pixels for a filter operation: a plurality of surrounding pixels including an object pixel to be reduced; and reduced pixels, from among pixels which have already been reduced, said reduced pixels being at least; a reduced pixel located before the pixel to be determined: a reduced pixel, located on the preceding line, which lies directly above the pixel to be determined; and a reduced pixel before said reduced pixel located on the preceding line. When a pixel referenced during the filter operation is included in a specific pattern, an exception process for correcting binary level results is provided.

16 Claims, 9 Drawing Sheets

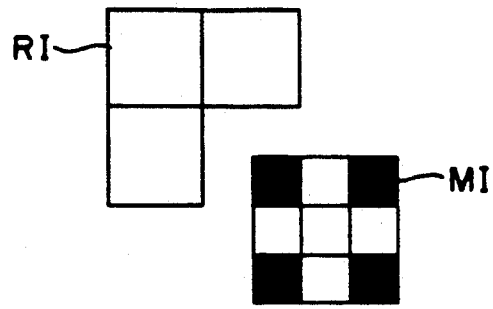
F I G. 7(a)
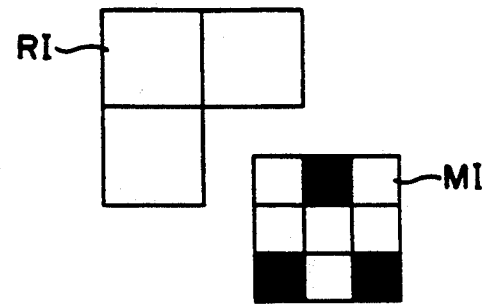
F I G. 7(b)
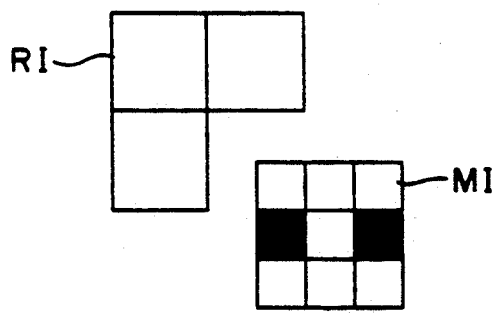
F I G. 7(c)
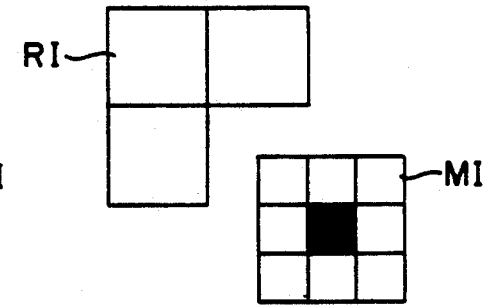
F I G. 7(d)
F I G. 7(e)

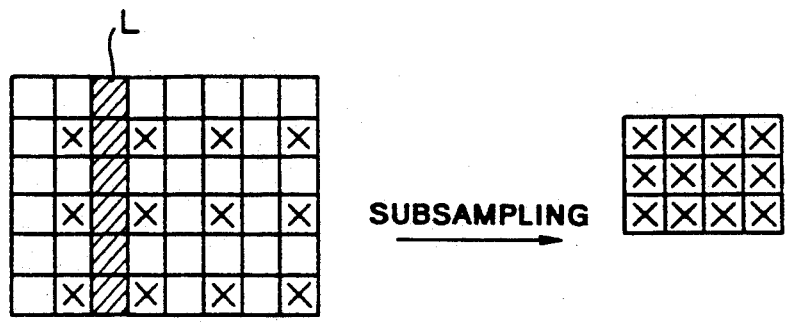
F I G. 11A
(PRIOR ART)
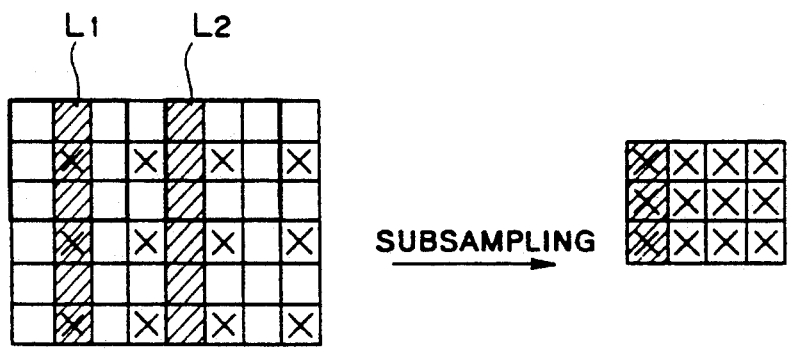
F I G. 11B (PRIOR ART)
| 1 | 2 | 1 |
|---|---|---|
| 2 | 4 | 2 |
| 1 | 2 | 1 |
FILTER COEFFICIENT
F I G. 12
(PRIOR ART)

IMAGE REDUCTION OF BINARY IMAGES USING FILTERING PROCESSING

This application is a division of application Ser. No. 07/501,846, filed Mar. 30, 1990, now U.S. Pat. No. 5,159,468.

BACKGROUND OF THE INVENTION

The present invention relates to an image reduction system in which binary level images are reduced.

In a facsimile apparatus which is a typical example of a conventional static image communication apparatus, a system is adopted in which images are sequentially scanned in a raster direction, encoded and transmitted. Since every pixel of the image must be encoded and transmitted in this system to send the entire image, transmission takes a long time, and therefore the application of the system to image communication services such as an image database service, videotex or the like is difficult.

In order to transmit an overall image quickly, hierarchy coding has been devised. An example of conventional hierarchy coding is shown in FIG. 10. Shown in the figure are frame memories 101 to 104 for storing 1, ½, ¼, and ⅛ reduction images, reduction sections 105 to 107 for creating respectively ½, ¼ and ⅛ reduction images, and encoders 108 to 111 for respectively encoding ⅛, ¼, ½ and 1 reduction images.

The reduction section 105 reduces images from the frame memory 101 by a technique in which the images are subsampled to ½ in both the main scanning and sub-scanning directions to create ½-size images and stored in a frame memory 102. Further, the ½-size images are reduced by the reduction section 106 to create ¼-size images and these images are stored in the frame memory 103. Likewise, ⅛-size low-resolution images are created and stored in the frame memory 104.

The images are in turn transmitted in codes beginning with lower resolution images so as to give a rough overall image. The example of FIG. 10(a) shows a case where images are reduced to ½, ¼ and ⅛ in both the main scanning and subscanning directions and encoding is performed in the order of ⅛, ¼, ½ and 1 (1 is the actual size of the image). The images are transmitted in this order. To encode a ⅛ image, the image stored in the frame memory 104 is in turn scanned and entropy encoding such as arithmetic coding is performed by referencing an object pixel to be encoded and the surrounding pixels. As regards a ¼ image, encoding is performed by the encoder 109 by referencing the pixels surrounding an object pixel from the frame memory 103 and the surrounding pixels of the ⅛ image from the frame memory 104 so that encoding efficiency is improved. Likewise, as regards the ½ image of the frame memory 102, the ¼ image of the frame memory 103 is referenced and encoded by the encoder 110, and as regards the actual-size image of the frame memory 101, the ½ image of the frame memory 102 is referenced and encoded by an encoder 111.

Reduction of binary level images is also performed in other than a still image communication apparatus. For example, it includes a case where images are output to printers of different output resolutions from the same image database. Where binary level images read at 400 dpi are output to a printer of 300 or 200 dpi, the images must be reduced to ¾ or ½ respectively in both the vertical and horizontal directions.

Where such reduction is performed, conventionally, subsampling which thins out images at a fixed interval, or a technique wherein images are made to pass through a low-pass filter before they are binarized again, is adopted.

In the hierarchy coding system, as mentioned above, rapid transmission of all images is made possible by transmitting reduced images in codes in an order from a low resolution. Therefore, it is necessary to leave information in reduced low-resolution images so that the full image can be easily scanned.

A conventional reduction method as described above has a drawback in that information is lost. FIG. 11A shows an example in which pixels with x marks in the original image (1) are subsampled to obtain an image (2) reduced to ½ in the vertical and in the horizontal directions.

In the case of subsampling only, if one line L lies in the middle of subsampling points (the x marks in the FIG. 11A), this line is lost during the reduction. To eliminate this drawback, a technique has been devised in which subsampling is performed after filtering is performed. An example of this is shown in FIGS. 11B and 12. The x marks in FIG. 11B denote sampling points. In the example of FIG. 11B, before subsampling is performed, a low-pass filter having the coefficients shown in FIG. 12 is applied to convert filter output to binary values. For example, when filter input is 8 or greater, filter output can be defined as 1; when smaller than 8, 0. However, even a system using filtering cannot remove the drawback that the line is lost when a vertical line L2 in the original image in the example of FIG. 11B lies between portions where subsampling is performed.

Accordingly, unless a line of the width of one pixel is preserved in any system in which reductions are repeated many times, the line will ultimately be lost in a low-resolution image. Hence, a narrow line such as a one-pixel line must be preserved irrespective of sampling points.

With a binary level pseudo-half-tone image such as a dither image or the like a drawback exists in that such a reduction may cause density information to be lost depending on sampling points. Where dots are scattered by a pseudo-half-tone process, in particular, in a low density or a high density, a problem exists in that half-tone is abruptly lost or density is reversed.

SUMMARY OF THE INVENTION

The present invention has been devised in light of the above-mentioned points. Accordingly, an object of the present invention is to provide an image reduction system which is intended to reduce binary level images without the loss of narrow lines in line pictures or the like, or the loss of density and information on dither images.

In order to achieve the foregoing object, there is provided with an image reduction system in which a reduction pixel value is determined by using, as reference pixels for a filter operation: (a) a plurality of surrounding pixels including an object pixel to be reduced; and (b) reduced pixels, among from pixels which have already been reduced, said reduced pixels being at least: (b1) a reduced pixel located before the pixel to be determined: (b2) a reduced pixel, located on the preceding line, which lies directly above the pixel to be determined; and (b3) a reduced pixel before said reduced pixel located on the preceding line.

These and other objects, features and advantages of the present invention will become clear in the following description of the preferred embodiments of the present invention, together with reference to the accompanying drawings.

BRIEF DESCRIPTION OF THE DRAWINGS

FIGS. 7(a-e) are views illustrating an example in which isolated points of a dither image or the like are lost by a reduction by only a filter operation;

FIG. 11A is a view illustrating an example of reduction by a conventional subsampling; and FIGS. 11B and 12 are views illustrating an example of reduction by a conventional low-pass filter and by sub-sampling.

DESCRIPTION OF THE PREFERRED EMBODIMENTS

First Embodiment

Figure 1:
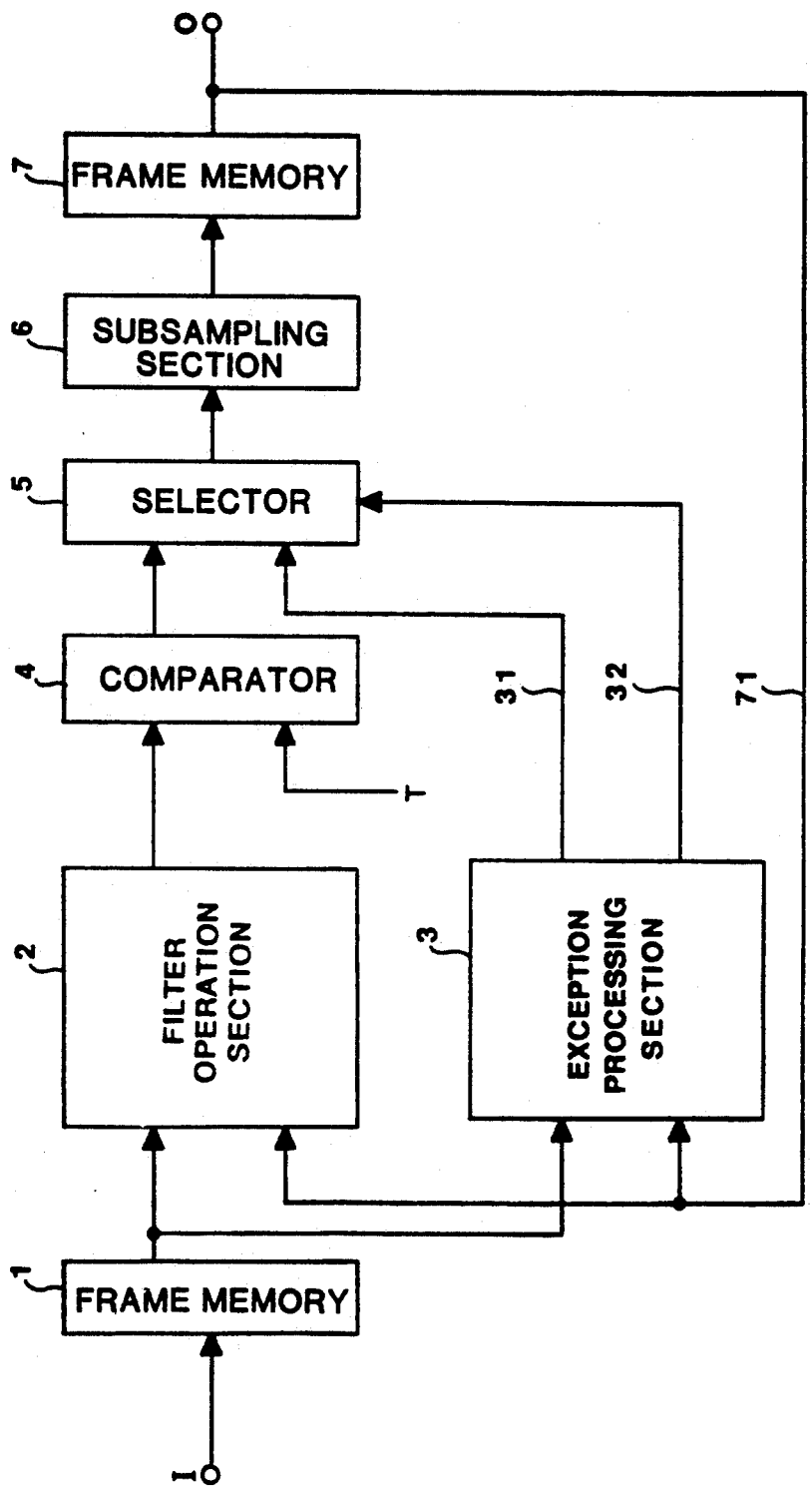
FIG. 1 is a block diagram showing the configuration of a binary level image reduction apparatus which is used in the present invention.

FIG. 1 shows the configuration of a binary level image reduction apparatus in which the present invention is used. In this embodiment, an example is shown in which an image is reduced by $\frac{1}{2}$ in both the vertical and the horizontal directions.

Numeral 1 denotes a frame memory for storing a binary level image to be reduced. The binary level image is, for example, input to the frame memory 1 via input I from an image reader or the like. The image stored in the frame memory 1 is input, for every raster, to the filter operation section 2. Pixels which have already been reduced are fed-back to the filter operation section 2 via feed-back line 71. Inter-pixel operations are performed among the object pixel to be reduced, the surrounding pixels, and the binary level pixels which have already been reduced in the filter operation section 2.

Figures 2A, 2B, 3A, 3B:
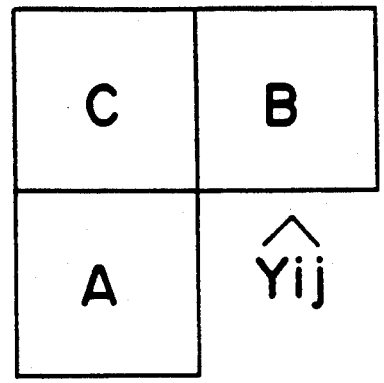
FIGS. 2a and 2b are views illustrating pixels under filter operation.
FIGS. 3a and 3b are views showing filter operation coefficients.

FIGS. 2a and 2b shows pixels used for filter operation performed in the filter operation section 2. The portion (a) of FIG. 2 shows object pixel $X_{ij}$ (i=1 to M, j=1 to N; M and N indicate image sizes in the vertical and horizontal directions) and surrounding pixels, which are 3×3 images with the object pixel $X_{ij}$ as its center. The portion (b) of FIG. 2 shows pixels A, B, C which have already been reduced and the position relation of the reduction pixels $\hat{Y}_{ij}$ to be determined.

In FIG. 2(b), A, B, C respectively correspond to: a reduction pixel before the reduction pixel $\hat{Y}_{ij}$ (one into which the operation result $Y_{ij}$ is converted in a binary manner) to be determined, a reduction pixel located at the same position as $\hat{Y}_{ij}$ on the preceding line of $\hat{Y}_{ij}$, and a reduction pixel preceding that. The filter operation is performed as follows: If filter output is denoted by $Y_{ij}$, $$Y_{ij} = 4 \times X_{i,j} + 2(X_{i,j-1} + X_{i-1,j} + X_{i+1,j} + X_{i,j+1}) + \quad (1)$$

$$(X_{i-1,j-1} + X_{i+1,j-1} + X_{i-1,j+1} + X_{i+1,j+1}) - 3(A + B) - C$$

That is, as shown in FIG. 3, this filter is constructed as a recursive filter in which the coefficients of FIG. 3(a) are given to pixels surrounding the object pixel and the coefficients of FIG. 3(b) are given to the reduction pixels on which filter processing has already been performed. Since the coefficient values exhibit a rotative symmetry about the object pixel $X_{ij}$ in FIG. 3(a), the surrounding pixel values can be calculated uniformly. The preservation of narrow line in the vertical, horizontal and diagonal directions can be improved by performing an operation in which the left pixel (immediately preceding), the upper pixel (one line before) and the upper left pixel (immediately preceding the one line before) among from the reduced pixels which have been subjected to the binarizing and sub-sampling operations as well as the filter operation, are used as the coefficients of the recursive operation, as shown in FIG. 3(b). Also, since the coefficients of the recursive portion are fed back symmetrically, the shape of a cyclic pattern of lines every other pixel, for example, a checkered pattern, is preserved during reduction operation.

Figure 4:
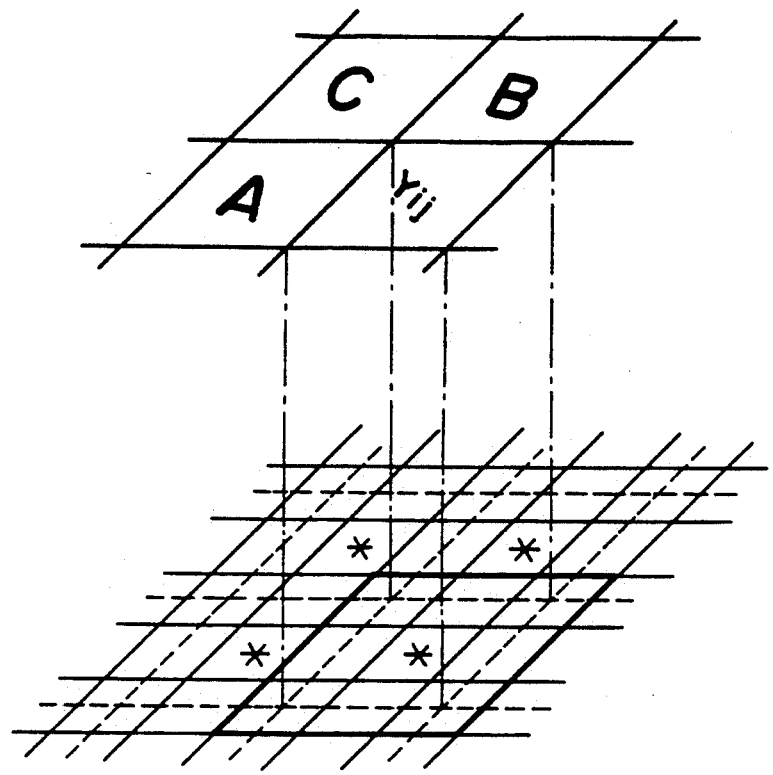
FIG. 4 is a view illustrating the relation between the subsampling position and the reduction pixels position.

FIG. 4 shows the relation between non-reduction pixels about the subsampling point * and pixels A, B, C which have already been reduced.

As is apparent from the filter coefficients of FIG. 3, non-reduced pixels having the largest correlation with the resulted reduction pixel $\hat{Y}_{ij}$ are 3×3 pixels surrounded by a thick line, and all the reduction pixels are not deviated in the direction shown in FIGS. 3a and 3b.

In the examples shown in FIGS. 2a and 2b and 3a and 3b, three types of reduction pixels have been used for use in filter operation, that is, a reduction pixel before the reduction pixel to be determined, a reduction pixel which lies on the preceding line directly above said reduction pixel to be determined, and a reduction pixel before said reduction pixel to be determined are used. However, reduction pixels according to the present invention are not limited to these three reduction pixels. For example, four or more reduction pixels which include a reduction pixel located two pixels preceding the reduction pixel to be determined, or a reduction pixel which lies on a line preceding by two lines directly above said reduction pixel to be determined, as well as said three types of the reduction pixels, may be used for the filter operation. According to this technique, the features of an original image can be preserved more satisfactorily in a reduction image. However, the scale of the filter operation section becomes larger.

The value $Y_{ij}$ (multi-level data) calculated according to equation (1) in the filter operation section is input to the comparator 4. The comparator 4 converts $Y_{ij}$ to a binary value as in the following: That is, supposing that $\hat{Y}_{ij}$ is a value after $Y_{ij}$ is converted to a binary value, when $Y_{ij} \geq T$, then $\hat{Y}_{ij} = 1$, when $Y_{ij} < T$, then $\hat{Y}_{ij} = 0$.

If the appearance probabilities of 1 and 0 with respect to input data according to this binary level conversion system are equally set, that is, each for 0.5, the expected value of the filter operation output is 4.5. Therefore, if T is set at 5, a binary level conversion output with respect to input data of 1–0 symmetric pattern becomes 1–0 symmetric. In this embodiment, T is set at 5. If the value of this T is varied, the binary level output, i.e., image quality, will be changed. In other words, as the value of T is increased, the ratio of the output being 0 becomes larger, whereas as it is decreased, the ratio of the output being 1 becomes larger. Therefore, if it is assumed that 1 denotes black and 0 denotes white, the former is particularly effective for a negative image and the latter for a positive image.

Figure 5:
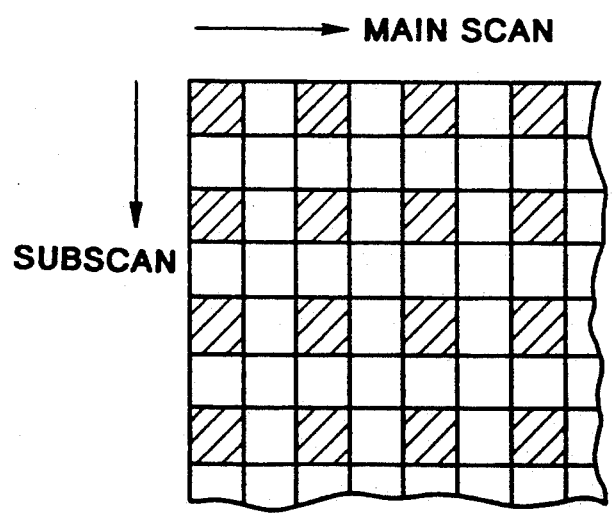
FIG. 5 is a view illustrating the subsampling position.

Data which has been converted to a binary value by the comparator 4 is selected by a selector section 5 and then input to a subsampling section 6. FIG. 5 shows positions where the subsampling is made by the subsampling section 6. A subsampled image which is ½ size in the vertical and horizontal directions (¼ in the term of area ratio) can be formed by sampling data shaded in the FIG. 5 at every other timing in the main scanning (horizontal) direction and the subscanning (vertical) direction. The reduction ratio can also be altered by changing this sampling ratio.

Reduction pixels which have been subsampled in the sampling section 6 are stored in turn into the frame memory 7 for each raster. Pixel data which has already been reduced and stored in the memory 7 are sent therefrom to the filter operation section 2 through a line 71 and, by regarding them as recursive components, a filter operation is performed in the filter operation section 2.

Figures 6A, 6B:
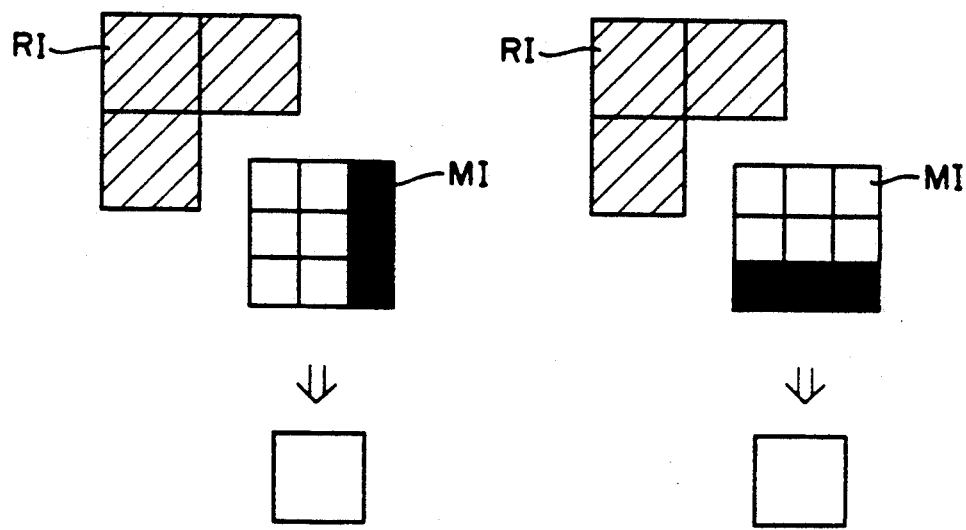
FIGS. 6a and 6b are views illustrating an example in which narrow lines are lost by a reduction by only a filter operation.

Next, an exception processing section 3 will be explained. Even in a system in which reduction images are created according to the above-mentioned method, there occurs a case where narrow lines are not preserved. FIGS. 6a and 6b and 7 show such an example. FIGS. 6 and 7 are expressed by symbols of FIG. 2. More specifically, the small 3×3 pixels of FIG. 2 correspond to non-reduction pixels MI of FIGS. 6a and 6b and 7, whereas the larger 3 pixels correspond to reduction pixels RI (of FIGS. 6a and 6b and 7) which have already been reduced. The symbols ■ and □ indicate black and white pixels respectively. The symbols of a hatched rectangle indicates pixels of "Don't care".

FIGS. 6a and 6b shows an example in which when a subsampling point lies in the center of the 3×3 non-reduced pixel MI, a one-pixel line is lost by reduction. A similar loss may occur in the edge or the like of an image. In the example of FIGS. 6a and 6b, the output value of the filter operation becomes 4 or smaller for any reduction pixel RI, and it will be reduced to a white pixel by the comparator 4.

FIGS. 7(a–e) explains the problems when the pseudo-half-tone of a dither image or the like is reduced. Since a pseudo-half-tone image has periodicity in black pixels, a problem arises in that half-tone density is greatly changed, or a dot image is lost, depending on the pixel position in relation to a sampling point. When all the three pixels of the reduction pixel RI are white as in FIGS. 7(a–e), the output values of the filter operation are all 4 or smaller, and they are reduced to white pixels. In these cases, however, there is a high possibility that they are isolated points of a half-tone image. Accordingly, unless they are reduced to black pixels, the above-mentioned problem will arise.

Therefore, an exception processing section 3 is provided as shown in FIG. 1. Thus, information of narrow lines, edges and isolated points or the like are preserved by performing exception processing apart from the filter operation processing and reduction processing by subsampling.

Image signals to be reduced are in turn input to the exception processing section 3 from the frame memory 1 for each raster in the same way as in the filter operation section 2. Here, the same pixels as the 3×3 pixels referenced by the filter operation section 2 are referenced at the same time. Pixels (A, B, C in FIG. 2) which are stored in the frame memory 7 and which have already been reduced are input to the exception processing section 3 through the line 71. That is, the filter operation section 2 and the exception processing section 3 perform a completely parallel processing.

Where 3×3 pixels MI not to be reduced and three pixels RI to be reduced which are input to the exception processing section 3 are of a pattern as shown in FIGS. 6a and 6b or FIGS. 7(a–e), the result obtained by binarizing them with the comparator 4 after the filter operation has been made is not preferable as reduction pixels. Hence, in these cases, a signal "1" indicating that it is an exception, is output to the line 32 at the same time the reduction result ("0" for white pixel, or "1" for black pixel) is output, as an exception pattern, to the line 31. Otherwise, where it is not an exception, the section 3 outputs "0" on the line 32. The lines 31 and 32 are connected to the selector section 5. When a signal on the line 32 is "0" indicating an exception pattern is not produced, a signal from the comparator 4 is selected. Conversely, when the line 31 is "1", it means an exception pattern is being produced and then selector 5 selects the result of the exception processing section 3, namely, the line 31.

An image signal selected by the selector section 5 is subsampled by the subsampling section 6 as mentioned above, then stored as a reduction image in the frame memory 7.

As has been described, the present embodiment apparatus comprises the recursive-type filter operation section 2 which uses pixels which have already been reduced as feedback coefficients, and the comparator 4 for binarizing the result of the operation. Therefore, a reduced image with such a narrow-line cyclic pattern or the like excellently preserved, can be created. Further, the provision of the exception processing section 3, which corrects the filter operation of the section 2, improves the preservation of narrow lines, edges, pseudo-haf-tone images or the like.

Second Embodiment

Figure 8:
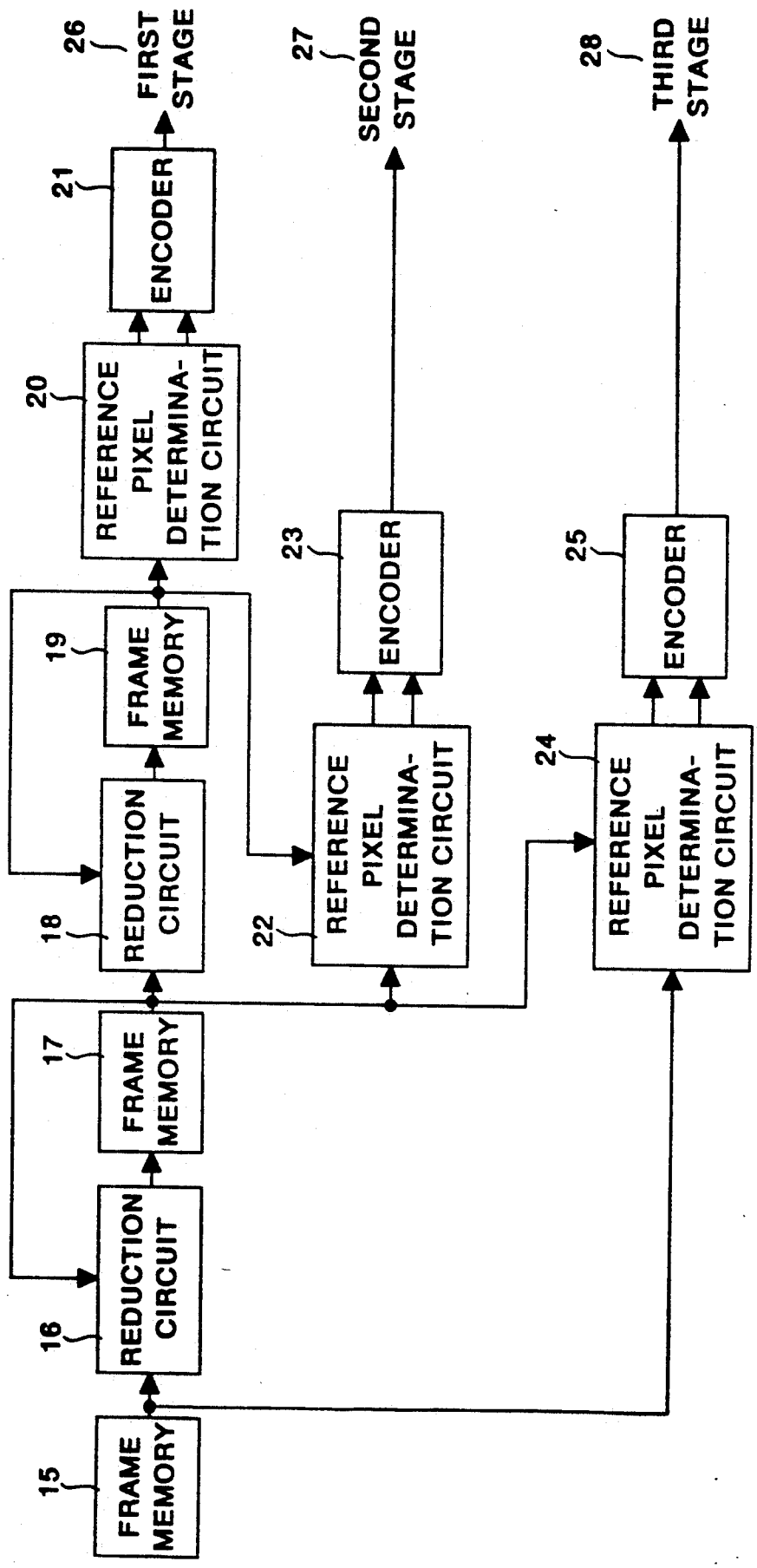
FIG. 8 is a block diagram showing a case where the present invention is used in hierarchy coding.

FIG. 8 is a block diagram in a case where the reduction apparatus shown in FIG. 1 is applied to a hierarchy coding.

Numerals 15, 17 and 19 denote frame memories; 16 and 18 denote reduction circuits in the configuration shown in FIG. 1; 20, 22 and 24 denote reference pixel determination circuits; 21, 23 and 25 denote encoders.

First, original picture data I of image signals in binary level is stored in a frame memory 15. Next, the original image data in the frame memory 15 is reduced by the reduction circuit 16 and then stored in the frame memory 17. At this time, the reduction circuit 16 uses the original image data in the frame memory 15 and reduction data which has already been stored in the frame memory 17 to perform the filter operation of the above-mentioned equation (1) for a reduction operation. The signals stored in the frame memory 17 are reduced to ½ the original picture. Likewise, signals read out from the frame memory 17 are reduced to an image ½ the original picture by the reduction circuit 18, by taking into consideration the reduction data read out from the frame memory 17, and are stored in the frame memory 19.

Reference pixel determination circuits 20, 22 and 24 detect the size (in the number of pixels) of the image data stored respectively in the frame memories 19, 17 and 15, for example, to set the number and position of reference pixels most appropriate for the coding using arithmetic codes.

In the encoder 21, ¼ image signals stored in the frame memory 19 are encoded using reference pixels set by the reference pixel determination circuits 20 and are output as a first-stage signal 26. Likewise, in the encoders 23 and 25, ½ images and original image signals stored in the frame memories 17 and 15 are encoded using reference pixels respectively set by the reference pixel determination circuits 22, 24 and then are output as a second signal 27 and a third signal 28 respectively.

In this way, by encoding and transmitting, in turn starting with the lower-resolution image data, the image data from the first to third stages, an entire image is identified sooner. If the data is unnecessary, transmission after the identification can be stopped. As a result, an efficient communication service is made possible.

Only up to the third stage of the image data has been explained in the above second embodiment. However, it is needless to say that image data can easily be expanded to any stage according to the present invention.

Encoders 21, 23 and 25 shown in FIG. 8 can be formed by entropy-coding of arithmetic codes or the like which estimation-encodes the value of an object pixel based on reference pixels obtained respectively by the reference pixel determination circuits 20, 22 and 24. Arithmetic codes are commonly known, so the explanation thereof is omitted.

As described above, by using the reduction apparatus shown in FIG. 1 for stepwise coding, progressive image coding which causes little picture quality deterioration can be effected.

Third Embodiment

Figure 9:
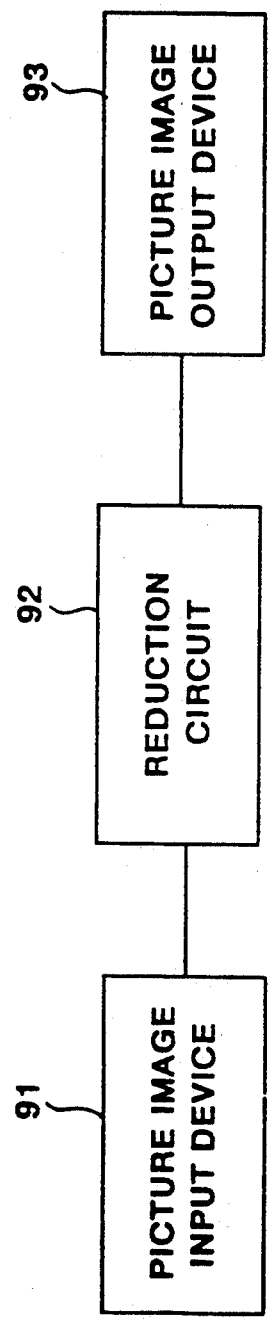
FIG. 9 is a block diagram showing a case where the present invention is used in an input/output device.
Figure 10:
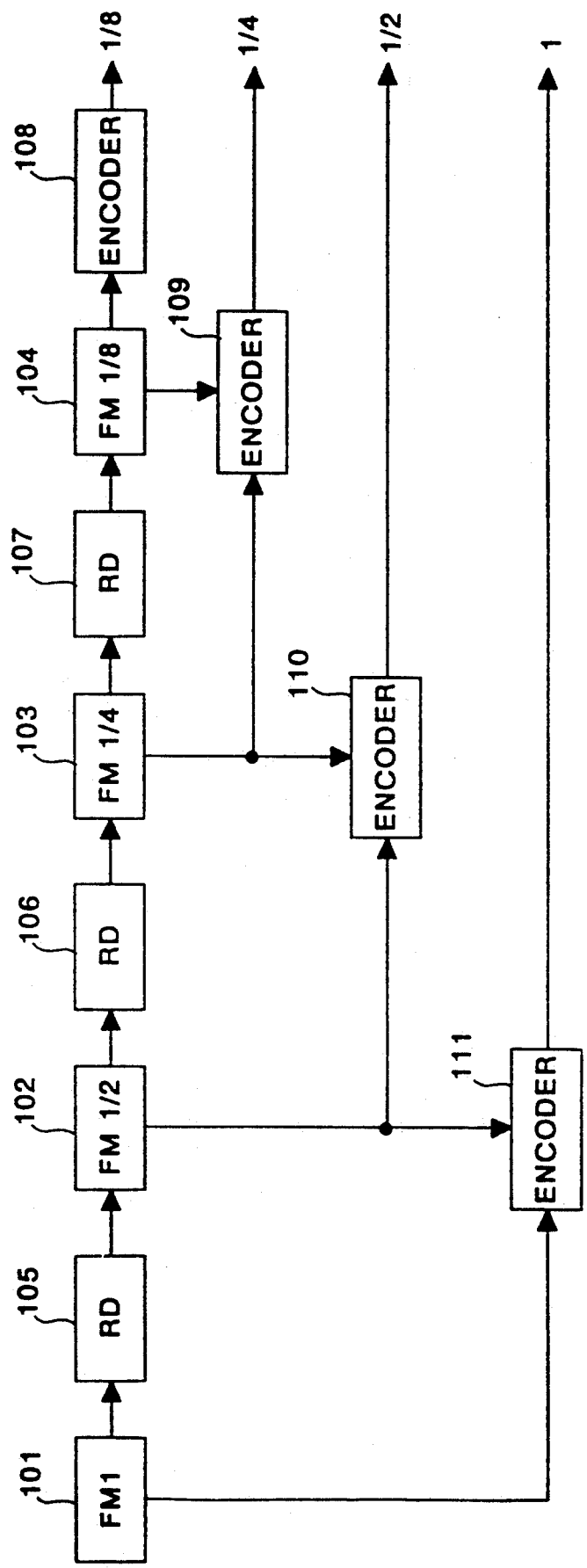
FIG. 10 is a block diagram illustrating a conventional hierarchy coding.

FIG. 9 is a block diagram showing a case where the reduction apparatus of FIG. 1 is used in an image input/output device. That is, the reduction apparatus is applied to a resolution conversion in a case where the resolution of an output device is lower than that of an image input device.

There are shown in FIG. 9, an image input device 91 such as for example, an image reading device or an image reception terminal, a reduction circuit 92 such as shown in FIG. 1, and an image output device 93 such as an image output printer or an image transmission terminal. When, for example, an image input from the image input device 91 is 400 dpi and an image output from the image output device 93 is 200 dpi, reduction images with little quality deterioration can be created by reducing the image to ½ using the configuration shown in FIG. 1. Even with other resolutions or other reduction ratios, the reduction apparatus can be applied by repeating a reduction operation, or by making the intervals of subsampling differ from each other. The reduction apparatus can also be applied to image reduction in the section between the disks in which an image database or the like is stored in place of an image input/output device.

As has been explained, according to the present invention, edges and narrow lines of an image, or information about a pseudo-half-tone image such as a dither image or the like, which has been lost in a conventional binary level image reduction, can be preserved even in a reduced image. In addition, by applying the present invention to a hierarchy coding, a low-resolution image with excellent information preservation can be obtained, and rapid transmission of the entire image can be performed effectively. Furthermore, when the resolution of an output device is lower than that of an input device, the reduction carried out by the present invention enables a reduced image that exhibits little deterioration to be obtained.

Many widely different embodiments of the present invention can be made without departing from the spirit and scope thereof, therefore it is to be understood that this invention is not limited to the specific embodiments thereof except as defined in the appended claims.

What is claimed is:

1. An image processing apparatus comprising:
   first memory means for storing original image data representing an original image;
   first reduction means for reducing the original image and outputting first reduced image data representing the first reduced image;
   second memory means for storing the first reduced image data;
   second reduction means for reducing the first reduced image and outputting second reduced image data representing the second reduced image; and
   encoding means for encoding the original image data output from said first memory means, the first reduced image data output from said second memory means, and the second reduced image data output from said second reduction means,
   wherein said first and second reduction means subject image data of pixels defined by the following (a-1) to (b-3) to a filtering process, so as to determine the first and second reduced image data of a pixel composing the first and second reduced image;
   (a-1) image data of an object pixel to be reduced;
   (a-2) image data of surrounding pixels of the object pixel to be reduced;
   (b-1) reduced image data of a first reduced pixel, the first reduced pixel being located before the object pixel;
   (b-2) reduced image data of a second reduced pixel, the second reduced pixel being located above the object pixel; and
   (b-3) reduced image data of a third reduced pixel, the third reduced pixel being located above the first reduced pixel and ahead of the second reduced pixel.

2. An image processing apparatus according to claim 1, wherein said first and second memory means comprise a frame memory.

3. An image processing apparatus according to claim 1, wherein the original image is a binary image.

4. An image processing apparatus according to claim 1, wherein said first and second reduction means reduce an input image by one-half.

5. An image processing apparatus according to claim 1, wherein said encoding means uses an entropy-coding method.

6. An image processing apparatus according to claim 5, wherein arithmetic codes are used in said entropy-coding method.

7. An image processing apparatus according to claim 1, wherein said encoding means comprises a reference pixel determination circuit to set the number and position of reference pixels.

8. An image processing apparatus according to claim 7, wherein said reference pixel determination circuit determines the reference pixel in accordance with a size of the original image data.

9. An image processing apparatus comprising:
frame means for storing original image data representing an original image;
reduction means for reducing the original image and outputting reduced image data representing a reduced image;
holding means for holding the reduced image data;
encoding means for encoding the reduced image data output from said reduction means,
wherein said reduction means subjects image data pixels defined by the following (a-1) to (b-3) to a filtering process, so as to determine the image data of each pixel composing the reduced image:
  (a-1) image data of an object pixel to be reduced from said frame means;
  (a-2) image data of surrounding pixels of the object pixel to be reduced from said frame means;
  (b-1) reduced image data of a first reduced pixel, the first reduced pixel being located ahead of the object pixel from said holding means;
  (b-2) reduced image data of a second reduced pixel, the second reduced pixel being located above the object pixel from said holding means; and
  (b-3) reduced image data of a third reduced pixel, the third reduced pixel being located above the first reduced pixel and ahead of the second reduced pixel from said holding means.

10. An image processing apparatus according to claim 9, wherein the original image is a binary image.

11. An image processing apparatus according to claim 9, wherein said reduction means reduces an input image by one-half.

12. An image processing apparatus according to claim 9, wherein said encoding means uses an entropy-coding method.

13. An image processing apparatus according to claim 12, wherein arithmetic codes are used in said entropy-coding method.

14. An image processing apparatus according to claim 9, wherein said encoding means comprises a reference pixel determination circuit to set the number and position of reference pixels.

15. An image processing apparatus according to claim 14, wherein said reference pixel determination circuit determines the reference pixel in accordance with a size of the original image data.

16. An image processing apparatus according to claim 9, further comprising correction means for correcting the reduced image data output from said reduction means, when the image data which are subjected to the filtering process have a predetermined pattern.

* * * * *

UNITED STATES PATENT AND TRADEMARK OFFICE
CERTIFICATE OF CORRECTION

PATENT NO. : 5,271,072                          Page 1 of 2
DATED      : December 14, 1993
INVENTOR(S): Tadashi Yoshida, et al It is certified that error appears in the above-indentified patent and that said Letters Patent is hereby corrected as shown below:

ON TITLE PAGE

In [57] ABSTRACT:

Line 7, "being at least;" should read --including at least:--.
Line 8, "determined:" should read --determined;--.

COLUMN 2

Line 65, "mined:" should read --mined;--.

COLUMN 4

Line 23, "among from" should read --from among--.
Line 36, "resulted" should read --resultant--.
Line 60, "section" should read --section 2--.

COLUMN 6

Line 8, "FIG. 2)" should read --FIG. 2(b))--.
Line 47, "do-haf-tone" should read --do-half-tone--.

COLUMN 7

Line 49, "as" should read --as,--.

UNITED STATES PATENT AND TRADEMARK OFFICE
CERTIFICATE OF CORRECTION

PATENT NO. : 5,271,072
DATED : December 14, 1993
INVENTOR(S) : Tadashi Yoshida, et al It is certified that error appears in the above-indentified patent and that said Letters Patent is hereby corrected as shown below:

COLUMN 8

Line 38, "image;" should read --image:--.

Signed and Sealed this

Sixteenth Day of August, 1994

Attest:

BRUCE LEHMAN

Attesting Officer

Commissioner of Patents and Trademarks